United States Patent
Ankel

(10) Patent No.: US 9,433,015 B2
(45) Date of Patent: Aug. 30, 2016

(54) MITIGATING GHOST SIGNALLING EFFECTS IN RADIO SYSTEMS

(75) Inventor: Par Ankel, Nodinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 513 days.

(21) Appl. No.: 13/524,598

(22) Filed: Jun. 15, 2012

(65) Prior Publication Data

US 2013/0336231 A1  Dec. 19, 2013

(51) Int. Cl.
*H04W 24/08* (2009.01)
*H04W 72/12* (2009.01)
*H04W 72/14* (2009.01)

(52) U.S. Cl.
CPC ......... *H04W 72/1268* (2013.01); *H04W 72/14* (2013.01)

(58) Field of Classification Search
CPC .................... H04W 72/1268; H04W 28/0278; H04W 76/023
USPC .......................................................... 370/329
See application file for complete search history.

(56) References Cited

U.S. PATENT DOCUMENTS

| | | | |
|---|---|---|---|
| 2006/0056355 A1* | 3/2006 | Love et al. .................... | 370/332 |
| 2007/0047474 A1* | 3/2007 | Anderson ......... | H04W 72/0413 370/277 |
| 2007/0049309 A1* | 3/2007 | Pan .................... | H04W 72/1289 455/509 |
| 2008/0059859 A1* | 3/2008 | Marinier ............... | H04L 1/1812 714/748 |
| 2009/0196256 A1* | 8/2009 | DiGirolamo et al. .................... | H04W 76/048 370/331 |
| 2010/0113004 A1* | 5/2010 | Cave ................... | H04W 52/365 455/422.1 |
| 2010/0157895 A1* | 6/2010 | Pani .................... | H04W 52/346 370/328 |
| 2010/0240383 A1* | 9/2010 | Ankel .................... | H04L 47/10 455/452.1 |
| 2011/0007700 A1* | 1/2011 | Aminaka .............. | H04W 72/04 370/329 |
| 2011/0128926 A1 | 6/2011 | Nama et al. | |
| 2012/0281642 A1* | 11/2012 | Sambhwani et al. ......... | 370/329 |
| 2013/0148580 A1* | 6/2013 | Han et al. ...................... | 370/328 |
| 2014/0056239 A1* | 2/2014 | Zhang ................. | H04W 52/146 370/329 |
| 2014/0133421 A1* | 5/2014 | Goodwin .......... | H04W 72/1252 370/329 |
| 2014/0307644 A1* | 10/2014 | Kwong ................ | H04L 5/0005 370/329 |
| 2015/0043337 A1* | 2/2015 | Kanamarlapudi ........................ | H04W 72/1252 370/230 |

OTHER PUBLICATIONS

"3rd Generation Partnership Project; Technical Specification Group Radio Access Network; Enhanced uplink; Overall description; Stage 2 (Release 11)", 3GPP Standard; 3GPP TS 25.319, 3rd Generation Partnership Project (3GPP), Mobile Competence Centre; 650, Route Des Lucioles; F-06921 Sophia-Antipolis Cedex, France, vol. RAN WG2, No. V11.3.0, Mar. 12, 2012, pp. 1-83, XP050580011.
International Search Report and Written Opinion issued on Mar. 22, 2013 in corresponding PCT application No. PCT/EP2012/061392, 14 pages.

* cited by examiner

*Primary Examiner* — Asad Nawaz
*Assistant Examiner* — Syed S Ali
(74) *Attorney, Agent, or Firm* — Rothwell, Figg, Ernst & Manbeck, P.C.

(57) ABSTRACT

A method in a base station, the method comprising, for a transmission time interval on the control channel: if an absolute grant is scheduled, transmitting the absolute grant; if an absolute grant is not scheduled, investigating whether at least one UE in the cell is configured for receiving on the control channel, and if this is not the case, refraining from transmitting; and if an absolute grant is not scheduled and at least one UE in the cell is configured for receiving on the control channel, the method further comprising at least one of: (i) transmitting an absolute grant for a non-configured UE in the cell; and (ii) selecting an arbitrary configured UE in the cell and transmitting an absolute grant, which was previously transmitted at an earlier transmission time interval, to the selected UE.

10 Claims, 8 Drawing Sheets

FIG.2 – PRIOR ART

MITIGATING GHOST SIGNALLING EFFECTS IN RADIO SYSTEMS

This application is related to International Patent Application No. PCT/EP2012/061392, filed on Jun. 15, 2012, and entitled "Mitigating Ghost Signalling Effects in Radio Systems." This International Application is incorporated by reference herein in its entirety.

TECHNICAL FIELD

This invention is directed to uplink resource handling signalling for user entities, base stations and networks. More particularly, the invention relates to systems and methods where the uplink rate is regulated by the base station by specific downlink signalling, such as a base station being adapted for transmitting an absolute grant signal on a control channel for a transmission time interval, for allowing a user entity to transmit an up-link transmission at a granted data rate on a corresponding transmission time interval.

BACKGROUND

Release 11 of the WCDMA (Wideband Code Division Multiple Access) specification—for instance in prior art document 3GPP TS 25.319, "Enhanced Uplink; Overall Description; Stage 2", Version V11.3.0, 2012-03-14—discloses an Enhanced Uplink also denoted High Speed Uplink Packet Access (HSUPA) communication scheme. The HSUPA aims to match the bit rates provided by the downlink High Speed Data Packet Access (HSDPA) scheme, so as to cater for improved interactive, background and streaming services.

In FIG. 1, a HSUPA network overview is indicated (HSDPA related channels are not included in the figure). The network comprises a Core Network communicating with a Radio Network Controller (RNC, S-RNC, D-RNC (Drifting-RNC)) over the iu interface, or iur interface; a first base station, Node B, B1, a second base station, Node B, B2, both base stations comprising a EUL scheduler unit. The EUL Scheduler (EUL_SCH) is also denoted the MAC-e Scheduler, and communicating with the RNC over respective iub interfaces.

The following HSUPA channels are transmitted over the air interface; the E-AGCH to convey absolute grant signalling from the MAC-e scheduler towards the UEs, the E-RGCH for relative grant signalling, E-HICH to convey acknowledgement feedback from Node-B decoding of UE transmitted data, Dedicated Physical Channel (DPCH) or Fractional DPCH to convey Transmit Power Control (TPC) commands, Enhanced DPDCH (E-DPDCH) to convey the MAC-e payload and Enhanced DPCCH (E-DPCCH) to convey the control signalling of the MAC-e.

Node B1 corresponds to the serving cell in this example (E-AGCH is only transmitted from the serving cell) and node B2 corresponds to a non-serving cell.

According to the HSUPA specification, the Enhanced Dedicated Channel (E-DCH) high speed uplink transport channel offers a number of features such as: short Transmission Time Interval (TTI), Fast Hybrid Automatic Repeat Request (ARQ) with soft recombining, fast scheduling for reduced delays, increased data rates and increased capacity.

When a UE is setting up communication with a Node B, the setup procedure may be followed by a HSDPA session, for e.g. downloading/surfing an internet page using TCP. Depending on the capabilities of the user entity, this may moreover involve HSUPA transmissions whereby the Node B that transmits TCP messages on the HSDPA downlink channel will receive TCP acknowledgements on the E-DCH uplink to Node B. Since Node-B determines, or schedules, at which pace a UE shall transmit on E-DCH, Node-B utilises the E-AGCH to convey scheduling decisions. A shorter delay, measured from the time until a TCP data segment is sent downlink until a TCP acknowledgement is sent on the uplink as a response, leads to a decreased downloading time of file transfers etc. due to the shorter round trip time estimate of the TCP layer.

In order to use a HSUPA service with Node B, the user entity is informed about which E-AGCH code it is supposed to receive downlink traffic on. For this purpose, the E-AGCH, which is a shared channel within the cell, is used. The E-AGCH can be defined to have a number of one to several channelization codes.

An E-DCH Radio Network Temporary Identifier is allocated by NodeB upon UE establishing an E-DCH (Enhanced UL DCH) channel. The E-DCH RNTI allocated to a UE/UE group shall be unique within the cell carrying the E-DCH.

E-AGCH channels are configured to a Node B in a configuration or re-configuration procedure with the RNC via the NBAP (Node B Application Part) signalling protocol.

HSUPA is similar in many respects to HSDPA. However, unlike HSDPA, HSUPA does not utilize a shared channel for data transfer in the uplink. In W-CDMA, each UE already uses a unique scrambling code in the uplink so each UE already has a dedicated uplink connection to the network with more than ample code channel space in that connection. This is in contrast to the downlink where the Node B uses a single scrambling code and then assigns different OVSF channelization codes to different UE's. The shared resource in the uplink is actually the interference level at the Node B, which the network manages through the fast closed loop power control algorithm. The fact that the UE has a dedicated connection to the network in the uplink influences the design of HSUPA quite considerably. The goals of HSUPA were to support fast scheduling (which allows the network to rapidly effect a change of which UE's that should transmit and at what rate) and to reduce the overall transmission delay. Transmission delay reduction is achieved through fast HARQ (hybrid automatic repeat request) retransmissions, in a manner very similar to HSDPA and at an optional shorter 2 ms TTI. As the primary shared resource on the uplink is the total power arriving at the base station, HSUPA scheduling is performed by directly controlling the maximum amount of power that a UE can use to transmit with at any given point in time.

The network has two methods for controlling the UE's transmit power on the E-DPDCH; it can either use a non-scheduled grant or a scheduled grant. In the non-scheduled grant the network simply tells the UE the maximum block size that it can transmit on the E-DCH during a TTI. This block size is signalled at call setup and the UE can then transmit a block of that size or less in each TTI until the call ends or the network modifies the non-scheduled grant via an RRC reconfiguration procedure. The block size deterministically maps to a power level, which is also configured by the network during call setup. The non-scheduling grant is most suited for constant-rate delay-sensitive application such as voice-over-IP.

Regarding the scheduled grant, the UE maintains a Serving Grant that it updates based on information received from the network. The Serving Grant directly specifies the maximum power that the UE can use on the E-DPDCH in the current TTI. As E-DCH block sizes map deterministically to power levels, the UE can translate its Serving Grant to the maximum E-DCH block size it can use in a TTI (the mapping of power levels is determined by the E-TFCI (The E-TFCI (E-DCH Transport Format Combination Identifier) includes information about the transport block set size, which is related to the data rate) Reference Power Offsets that are signalled at call setup).

There are two ways the network can control the UE's Serving Grant. The first is through an absolute grant, transmitted on the shared E-AGCH downlink channel, which signals a specific, absolute number for the Serving Grant. The other way is through relative grants, transmitted using the downlink E-RGCH channels, that incrementally adjust a UE's Serving Grant up or down from its current value. At any given point in time, the UE will be listening to a single E-AGCH from its serving cell and to one or more E-RGCH's. The E-AGCH is a shared channel so the UE will only update its Serving Grant if it receives a block on the E-AGCH that is destined for it (the E-RNTI identity signalled at call setup is used on the E-AGCH to direct transmissions to particular UE's). The E-AGCH transmission contains an Absolute Grant Value and an Absolute Grant Scope. The value corresponds to a maximum rate and the scope can be set to either "all HARQ processes" or "per HARQ process". The E-RGCH is also shared by multiple UEs, but on this channel the UE is listening for a particular orthogonal signature rather than a higher layer identity. If it does not detect its signature in a given TTI, it interprets this as a "Hold" command and thus makes no change to its Serving Grant.

Since bandwidth needs vary dynamically over time, it is desirable that the power emissions by user entities are regulated speedily so that bandwidth is not unnecessarily wasted. User entities transmit requests as Happy/Not Happy concerning their need for higher speeds.

There is a risk that an UE falsely detects an absolute grant that was not transmitted, also called a ghost grant. Such a ghost grant may cause the UE to transmit on a rate that the NodeB is not ready to receive at.

FIG. 2 shows the E-AGCH—E-DCH relation. It is noted that more E_AGCH channels (E-AGCH#1; E-AGCH#2) may be provided for a cell (Cell 0). If we look at a UE assigned to E-AGCH#1, from instance t_a, where an absolute grant, value X, (All HARQ) is received, the UE can use the maximum grant X, until further notice, At a following instance, t_b, the UE may use the maximum grant, X+1, (All HARQ) until further notice. However re-transmissions are allowed on grant X until they "time out".

The inventors have found that according to the current standardized specification—which is not the only background field the invention is directed—Node B will in such situation where a ghost grant is detected by the UE; send a NACK on E-HICH, if it can not be decoded. It will also send a new Absolute Grant to avoid the problem for new UE transmissions. However, the 3GPP standard allows for the UE to re-transmit at a previous grant level, c.f. FIG. 2. When no change is needed, nothing is transmitted on the E-AGCH, so typically there is a lot of DTX on the E-AGCH channels. A ghost grant at the highest level (AG index 31) may appear. This is not so unlikely because—depending on parameter settings—several of the AG Indexes can map towards the highest level. Such a ghost grant will cause a huge power increase in the cell causing massive interference. This will disturb the decoding of the other UEs. Since Node B may have no resources to decode transmissions or because of high interference, it may also fail and a new NACK is sent. This will go on until the maximum allowed number of re-transmissions are reached (e.g. 7) which will cause a substantial amount of interference in the cell. Eventually, the UE will give up and stop transmitting, which subsequently will lead to an upper layer RLC (Radio Link Control layer) re-transmission. Additionally, neighbouring cells are impacted by the increased interference.

According to the inventors, the risk for a false detection of E-AGCH, for a 2 ms TTI UE can be assessed as follows: In one minute there are 30.000 TTIs. With 16 bit CRC (Cyclic Redundancy Check) there are 65.536 combinations. In lab and field tests, one typically experiences a false E-AGCH (E-AGCH: E-DCH Absolute Grant Channel) detection in a UE in the interval of a few minutes.

SUMMARY

It is a first object of the invention to minimize the detection of "ghost signals" in user entities, UEs.

This object has been achieved by a method in a base station, adapted for scheduling and receiving uplink transmissions from user entities, UEs, in a cell and further forwarding data related to such transmissions to a core network. The base station is being adapted for transmitting an absolute grant signal on a control channel for a transmission time interval, for allowing a user entity to transmit an up-link transmission at a granted data rate on a corresponding transmission time interval. The method comprises the steps, for a transmission time interval on the control channel, of: if an absolute grant is scheduled, transmitting the absolute grant; if an absolute grant is not scheduled, investigating whether at least one UE in the cell is configured for receiving on the control channel, and if this is not the case, refraining from transmitting (DTX); if an absolute grant is not scheduled and at least one UE in the cell is configured for receiving on the control channel. Moreover, the method comprises at least one of: (a) the step of—transmitting an absolute grant for a non-configured UE in the cell; and (b) the steps of selecting an arbitrary configured UE in the cell; and transmitting an absolute grant, which was previously transmitted at an earlier transmission time interval, to the selected UE.

The above object has further been achieved by a base station comprising a scheduler (SCH) adapted for scheduling and receiving uplink transmissions from user entities, UEs, in a cell and further forwarding data related to such transmissions to a core network; the base station being adapted for transmitting an absolute grant signal on a control channel for a transmission time interval, for allowing a user entity to transmit an up-link transmission at a granted data rate on a corresponding transmission time interval. The base station is being further adapted for—for a transmission time interval on the control channel—if an absolute grant is scheduled, transmitting the absolute grant; if an absolute grant is not scheduled, investigating whether at least one UE in the cell is configured for receiving on the control channel, and if this is not the case, refraining from transmitting (DTX);and if an absolute grant is not scheduled and at least one UE in the cell is configured for receiving on the control channel.

The base station being adapted for carrying out at least one of the following two options, a) and b): (a) transmitting an absolute grant for a non-configured UE in the cell; and (b) selecting an arbitrary configured UE in the cell; and—transmitting an absolute grant, which was previously transmitted at an earlier transmission time interval, to the selected UE.

By ensuring that "something" is transmitted on the E-AGCHs, rather than performing a discontinuous transmission, DTX, under the various conditions specified, UEs are enabled to detect the channel and derive a cyclic redundancy check, CRC, that do not match in case the specific transmission is not addressed to the UE's in question. By signalling above the noise floor, this lowers the risk of detecting so-called "ghost grants". The rate of ghost grant detection in UE's are consequently lowered according to the invention.

A further object of the invention is to minimize the detection of ghosts in user entities, UEs wile limiting downlink power consumption.

According to a further aspect of the invention the transmission of an absolute grant for a non-configured identity for a UE or the transmission of an absolute grant which was previously transmitted at an earlier transmission time interval, is performed at a reduced power level in relation to the power level at which a scheduled absolute grant is transmitted.

DETAILED DESCRIPTION

Figure 4:
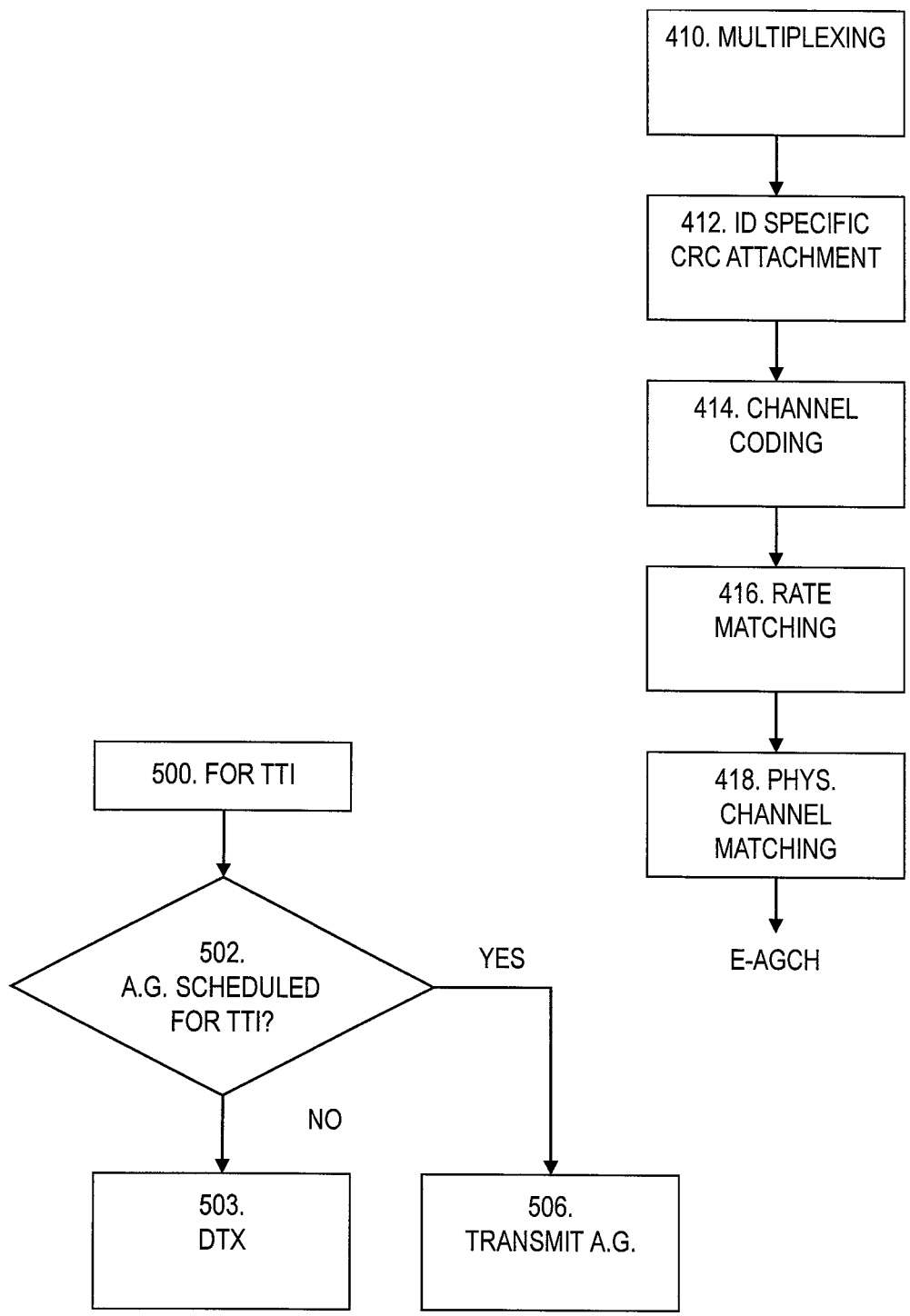
FIG. 4 shows aspects of an internal reference design of the applicant.

FIG. 4 show elements of a non-public reference design relating to the radio coding for the E-AGCH channel. In step 410 absolute grant values per HARQ or all HARQ as well as a HARQ scope value are input in a multiplexing stage 410. From the multiplexing stage an ID specific CRC attachment is performed. A UE specific identifier called E-RNTI is used to create a 16 bit cyclic redundancy check, CRC, see 3GPP 25.212, v11.1.0; Multiplexing and channel coding (FDD); chapters 4.2.1 and 4.10. Thereafter, channel coding 414, physical rate matching 416, and finally physical channel matching are defined for the absolute grant signals to be transmitted on the E-AGCH channel.

The functionality of the prior art can be interpreted as per each individual transmission time interval, TTI, 500; the scheduler investigates whether an absolute grant is scheduled for the TTI in question. If yes, the absolute grant is transmitted, 506, and if no the transmission is discontinued, DTX, 503.

Figure 1:
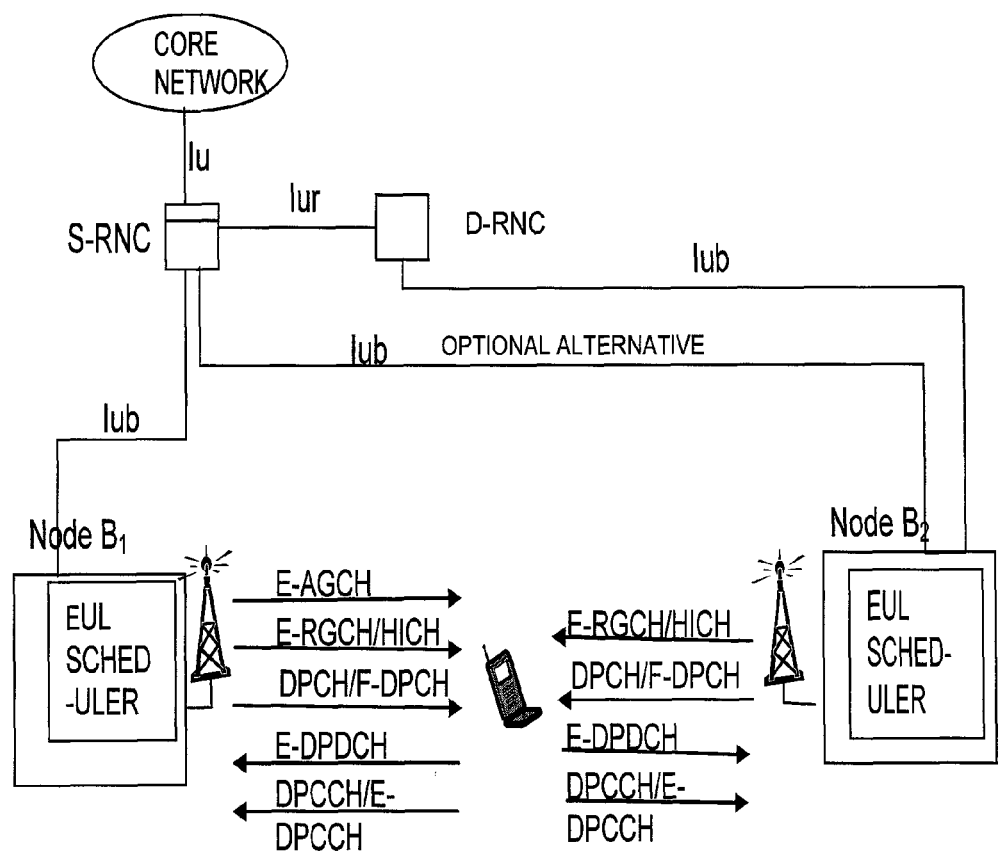
FIG. 1 shows basic elements of a prior art HSUPA network and signalling.
Figure 2:
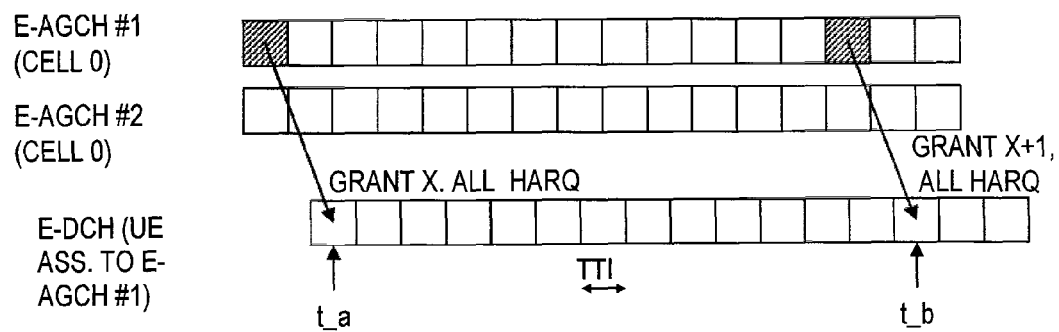
FIG. 2 shows a channel relationship of the prior art.
Figure 3:
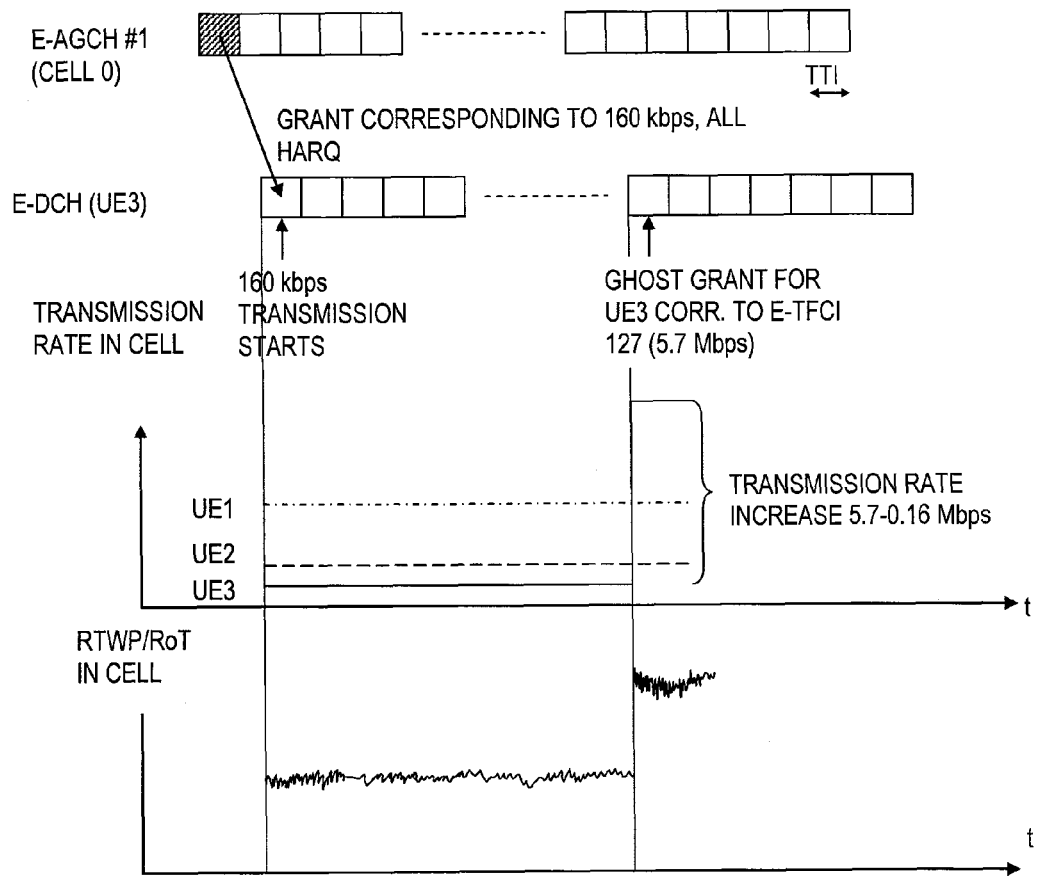
FIG. 3 shows an exemplary occurrence of a "ghost grant", i.e. an erroneously detected grant.

In FIG. 3, the effects of such E-AGCH handling are shown. For a cell denoted Cell 0 an absolute grant is transmitted providing for an up-link bit-rate of 160 kbps for UE3 on the E-DCH channel. As shown n the figure, other UE's, UE1 and UE2, in the cell may transmit at comparatively higher levels than UE3. At a following TTI, a ghost grant is falsely detected in UE3 perceiving a bit rate 5.7 Mbps, increased from 0.16 Mbps. An incremental large increase in the rise over thermal, RoT, or Received Total Wideband Power, RTWP, level is experienced in the cell.

Figure 5:
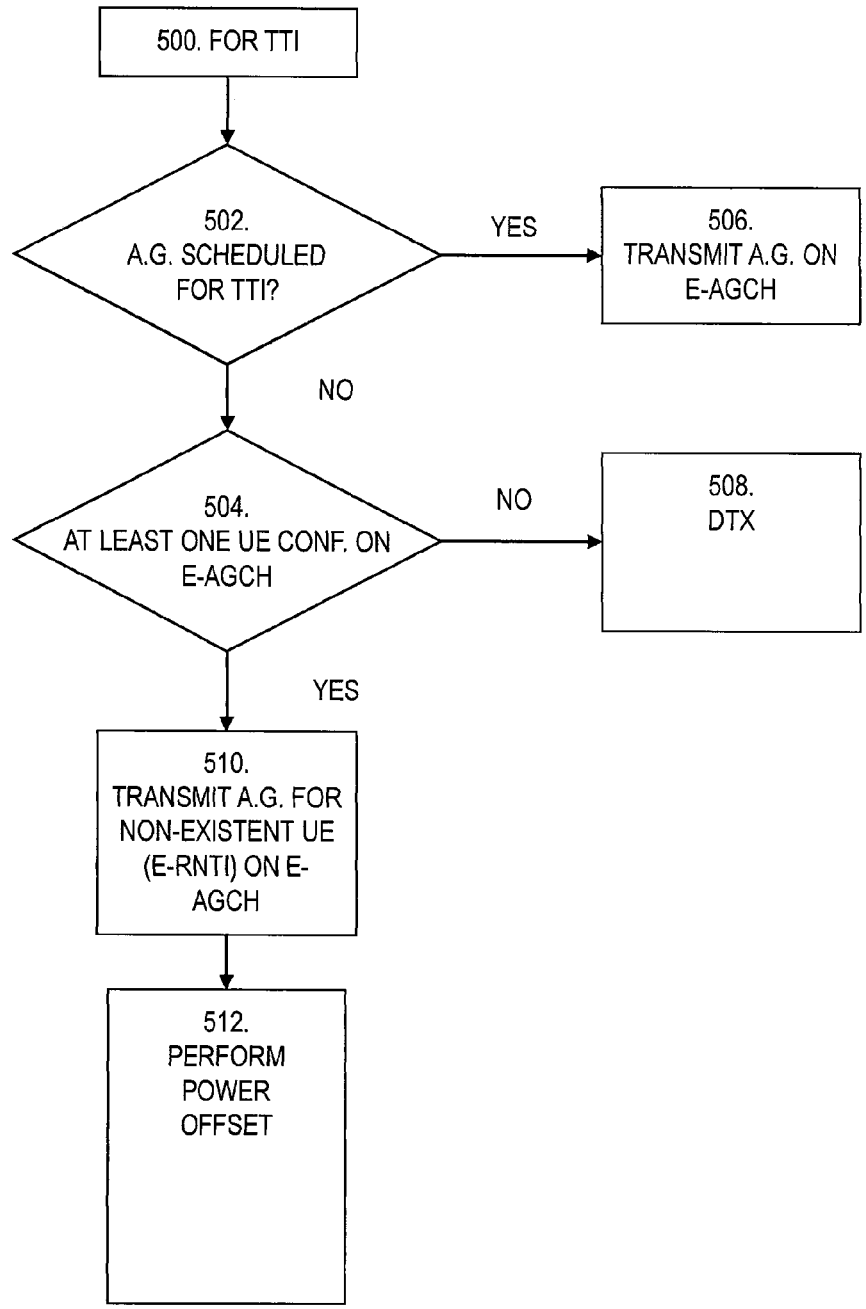
FIG. 5 shows a first embodiment of a method according to the invention.

In FIG. 5, is shown a first embodiment of a method according to the invention in a base station adapted for scheduling and receiving uplink transmissions from user entities, UEs, in a cell and further forwarding data related to such transmissions to a core network.

The base station is adapted for transmitting an absolute grant signal on a control channel, E-AGCH, for allowing a user entity to transmit an up-link transmission at a granted data on a corresponding transmission time interval 500 on the control channel. In case more control channels are provided, the method may be carried out for each control channel.

The method comprises the steps 502, 504, 506, 508, 510 for a transmission time interval, step 500:

In step 502 it is investigated whether an absolute grant is scheduled. If so, the base station is transmitting 506 the absolute grant on the control channel.

If an absolute grant is not scheduled in 502, an investigation is made, step 504 as to 504 whether at least one UE in the cell is configured for receiving on the control channel E-AGCH, and if this is not the case, it is refraining from transmitting anything, i.e. the base station is performing a discontinuous transmission, DTX.

If, on the other hand, an absolute grant is not scheduled 502 and at least one UE in the cell is configured for receiving 504 on the control channel, E-AGCH—the method is transmitting 510 an absolute grant for a non-configured UE in the cell.

By insuring that "something" is transmitted on the E-AGCHs, rather than performing a discontinuous transmission, DTX, under the various conditions specified, UEs are enabled to detect the channel and derive a cyclic redundancy check, CRC, that do not match in case the specific transmission is not addressed to them. By signalling above the noise floor, this lowers this risk of detecting so-called "ghost grants". The rate of ghost grant detection in UE's are consequently lowered according to the invention.

Figure 6:
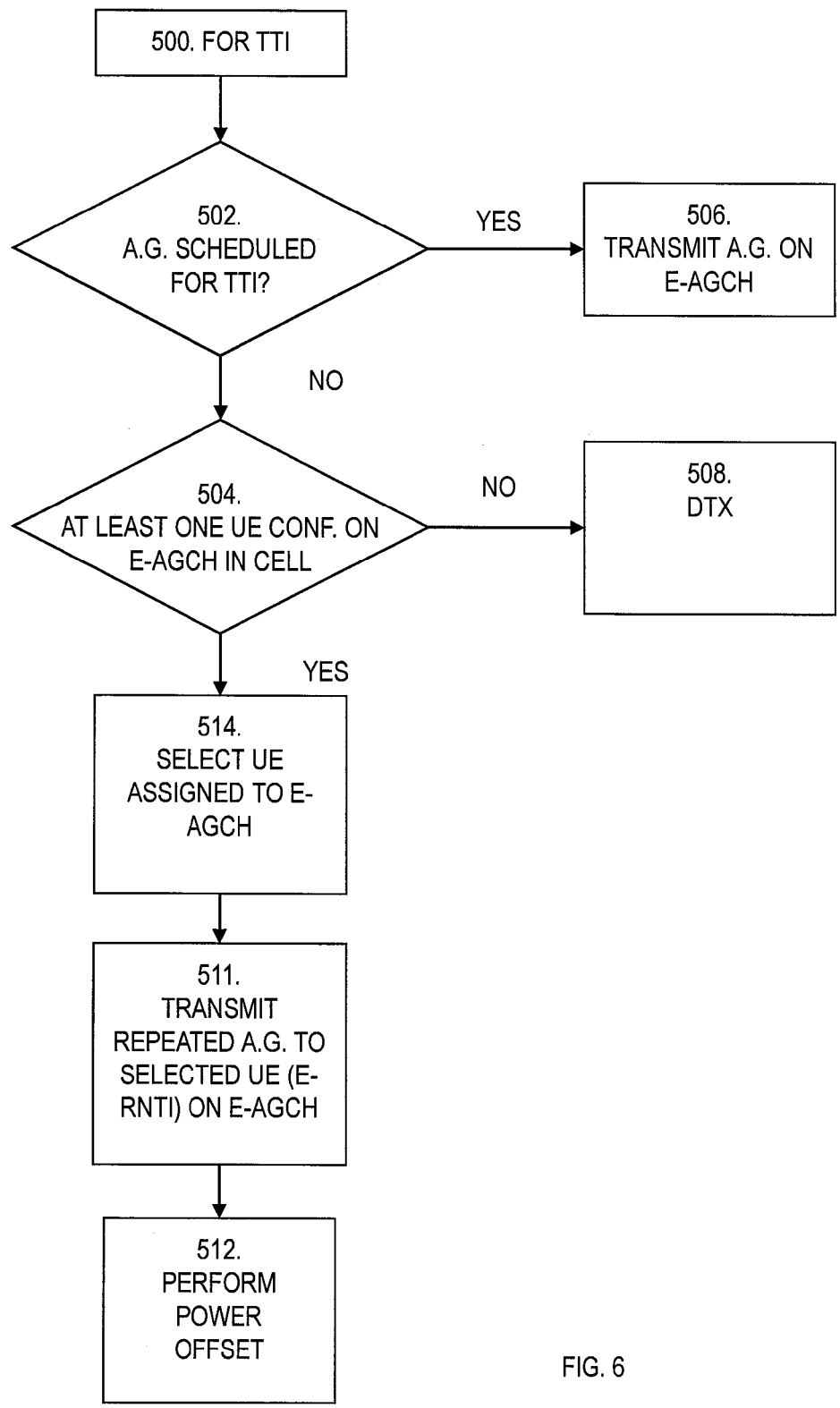
FIG. 6 shows a second embodiment of a method according to invention.

In FIG. 6 an alternative embodiment is shown, where step 510 is replaced by steps 514 and 511. Method steps with same references as above have the same content and will not be repeated.

Hence, if an absolute grant is not scheduled and at least one UE in the cell is configured for receiving 504 on the control channel E-AGCH, the method is carrying out the steps of—selecting 514 an arbitrary configured UE in the cell; and—transmitting 511 an absolute grant, which was previously transmitted at an earlier transmission time interval, i.e. repeating the grant, to the selected UE.

This embodiment is beneficial for isolated single cell uses which have the property of not providing soft handover, HO. Transmitting repeated absolute grants to selected UE's can be a problem in soft HO, because a non-serving radio link, RL, might send a relative grant (1 SG (Serving Grant) index down) while the repeated AG can increase the grant.

Figure 7:
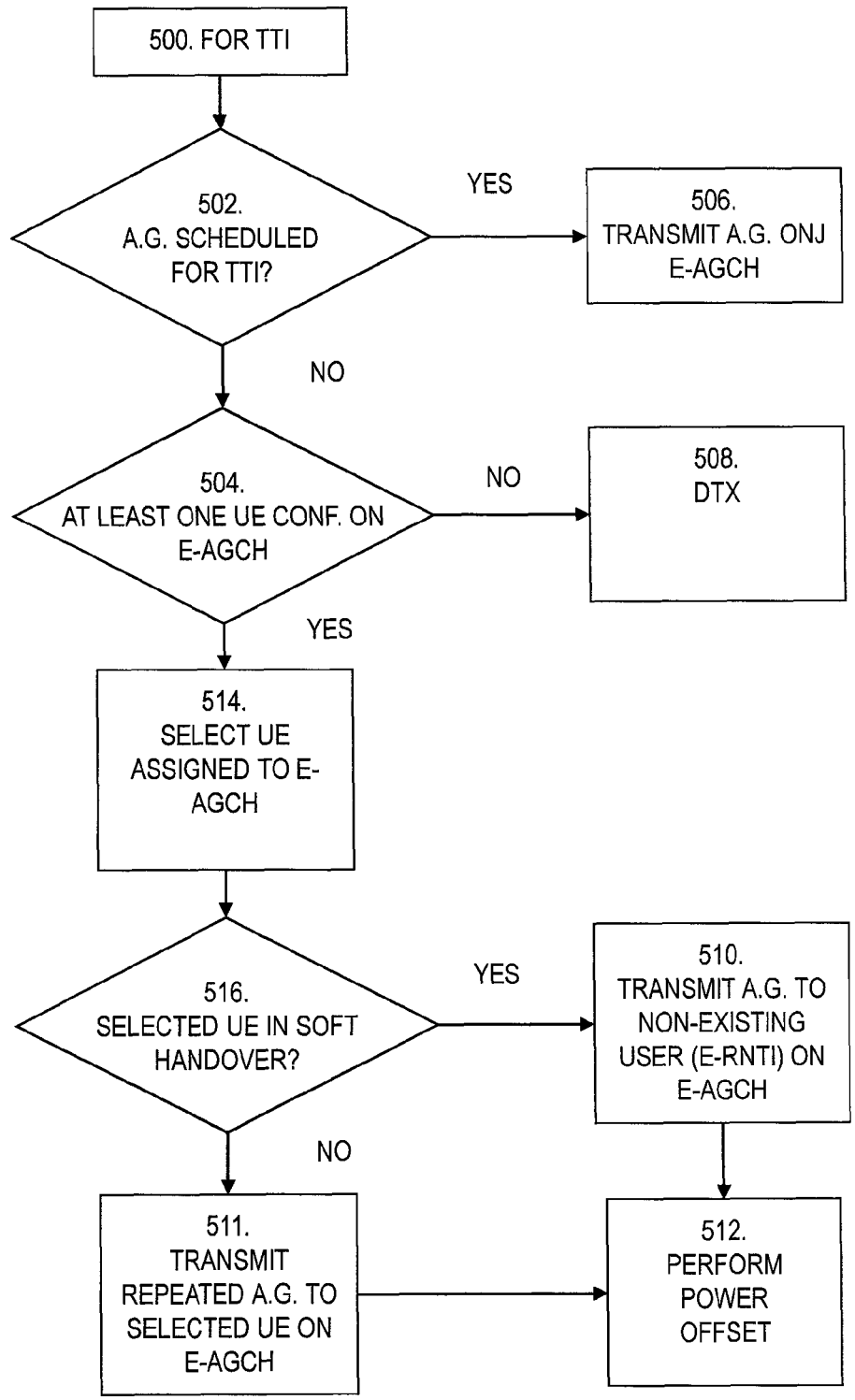
FIG. 7 shows a third embodiment of a method according to invention.

According to a further embodiment of the invention, a power offset step 512, shown in FIGS. 5, 6 and 7 is performed for the transmissions in step 510 and 511. It is found, according to the invention, that e.g. a reduced value, e.g. 3 dB lower, may be sufficient to avoid false E-AGCH detections in relation to using the power level for transmitting absolute grants in e.g. step 506 on the transmission in steps 511 and 510. In practice, reduced values of 2 dB may suffice. Thereby, not more DL power than necessary is used. It is seen that the amount of power level reduction is a trade off. With the reduced power, the rate of false detections is decreasing. However, DL power available for other DL transmissions, so as for HSDPA, will increase.

According to further aspects, the methods of the invention are particularly suitable for systems operating according to High Speed Uplink Packet Access, HSUPA.

The base station may be a NodeB.

The control channel may be an Enhanced Dedicated Channel, E-DCH, Absolute Grant Channel, E-AGCH, channel.

The step of transmitting an absolute grant for a non-configured UE in the cell may cor-respond to transmitting an absolute grant for an Enhanced Dedicated Channel, E-DCH, Radio Network Temporary Identifier, E-RNTI which is not configured in the cell.

In FIG. 7, a further embodiment is shown.

In relation to FIG. 6, a further step 516 is checking whether the selected UE is in soft handover. If yes the method moves to step 510 and if no the method moves to step 511. Again, the embodiment may as a further aspect provide a power offset, step 512, following from both steps 510 and 511.

As mentioned above, E-AGCH false detections cause several problems. It leads to additional interference, maybe at very high levels, since ghost signals may appear "on top of" an already loaded cell. Which cause decoding error, block error rate (BLER). Ghost detection in UEs may also lead to decoding problems in NodeB, due to Node B resource constraints. Ghost grants moreover lead to RLC re-transmissions and HARQ failures. The embodiments of the invention alleviate these problems at the cost of a slightly higher DL power consumption.

Figure 8:
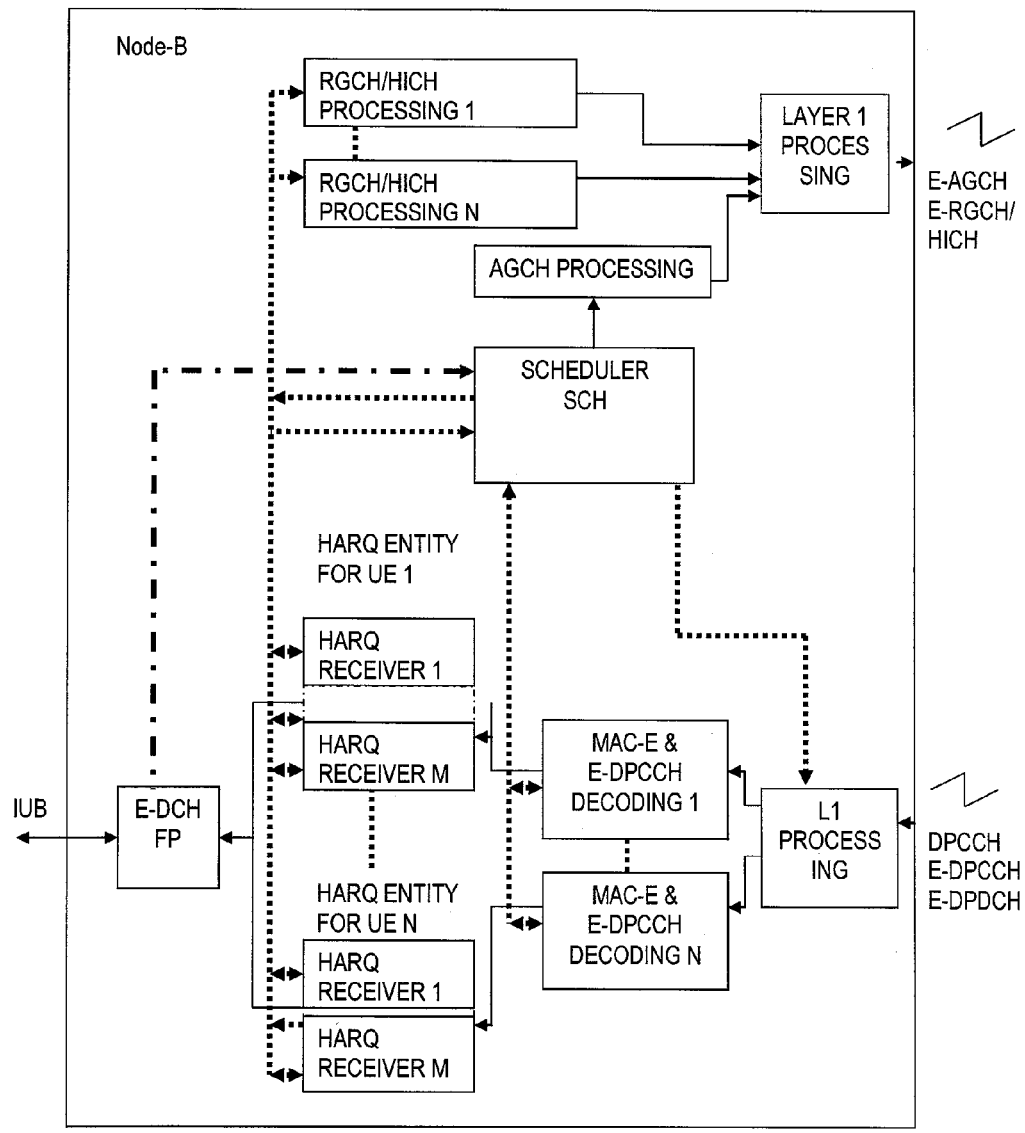
FIG. 8 shows an exemplary base station according to the invention.

In FIG. 8, an exemplary base station according to the invention is shown, also denoted Node B, being capable of operating both as a serving base station and as a non-serving base station.

The base station comprises E-RGCH/HICH processing stages 1-$n$, layer 1 processing, E-AGCH processing, a scheduler, SCH, respective HARQ entities for user entities 1-$n$, each HARQ entity comprising plurality of HARQ receivers for receiving packets 1-$m$ according to the HARQ process for each user entity. Node B moreover comprises Layer 1 processing means for communicating over E-AGCH and E-RGCH channels over the air interface, L1 processing means for communicating over DPCCH, E-DPCCH and E-DPDCCH channels. Moreover, the base station comprises E-DPCH FP means for communicating over the iub interface. MAC-e E-DPCCH decoding means 1-$n$ is provided for HARQ entities for UE 1-$n$. According to the invention, the method steps concerning Node B according to the invention may be implemented in the scheduler.

Hence there is provided a base station comprising a scheduler, SCH, adapted for scheduling and receiving uplink transmissions from user entities, UEs, in a cell and further forwarding data related to such transmissions to a core network.

The base station being adapted for transmitting 506 an absolute grant signal on a control channel E-AGCH for a transmission time interval, for allowing a user entity to transmit an up-link transmission at a granted data rate on a corresponding transmission time interval 500.

The base station is further adapted for, for a transmission time interval on the control channel, if an absolute grant is scheduled 502, transmitting 506 the absolute grant; if an absolute grant is not scheduled 502, investigating 504 whether at least one UE in the cell is configured for receiving on the control channel E-AGCH, and if this is not the case, refraining 508 from transmitting DTX; and if an absolute grant is not scheduled 502 and at least one UE in the cell is configured for receiving 504 on the control channel E-AGCH, the base station being adapted for carrying out at least one of: (a) transmitting 510 an absolute grant for a non-configured UE in the cell; and (b) selecting 514 an arbitrary configured UE in the cell and transmitting 511 an absolute grant, which was previously transmitted at an earlier transmission time interval, to the selected UE.

For the case the base station being adapted to—selecting 514 an arbitrary configured UE in the cell and transmitting 511 an absolute grant which was previously transmitted at an earlier transmission time interval to the selected UE; the base station is being further adapted for investigating 516 whether the selected UE is in soft handover, and if not—transmitting 511 an absolute grant which was previously transmitted at an earlier transmission time interval to the selected UE—and otherwise—transmitting 510 an absolute grant for a non-configured UE in the cell on the control channel.

According to a further aspect the transmission 510 of an absolute grant for a non-configured UE in the cell or the transmission of 511 an absolute grant which was previously transmitted at an earlier transmission time interval, is performed 512 at a reduced power level in relation to the power level at which a scheduled 502 absolute grant 506 is transmitted.

According to an embodiment, the reduced power level is at least 2 dB below the level at which a scheduled 502 absolute grant 506 is transmitted.

Moreover, the base station may be adapted for operating according to High Speed Uplink Packet Access, HSUPA. The base station could be a so-called NodeB. The control channel could be constituted by a Enhanced Dedicated Channel, E-DCH, Absolute Grant Channel, E-AGCH, channel; and the base station could according to an embodiment be adapted for transmitting an absolute grant for a non-configured UE in the cell corresponds to the base station being adapted for transmitting an absolute grant for an Enhanced Dedicated Channel, E-DCH, Radio Network Temporary Identifier, E-RNTI which is not configured in the cell.

The invention claimed is:

1. A method in a base station adapted for scheduling and receiving uplink transmissions from user entities (UEs) in a cell, the method comprising, for a giving transmission time interval (TTI) on the absolute grant channel:
   determining that no absolute grants are scheduled to be transmitted on the absolute grant channel during the given TTI;
   determining that at least one UE is configured for receiving on the absolute grant channel during the given TTI; and
   transmitting an absolute grant on the absolute grant channel in response to determining that: no absolute grants are scheduled to be transmitted on the absolute grant channel during the given TTI and at least one UE is configured for receiving on the absolute grant channel during the given TTI, wherein
   transmitting the absolute grant in response to the determination that: no absolute grants are scheduled to be transmitted on the absolute grant channel and at least one UE is configured for receiving on the absolute grant channel comprises transmitting, during the given TTI, the absolute grant on the absolute grant channel, wherein the absolute grant comprises a UE identifier that is not allocated to any UE or UE group in the cell, and the UE identifier is an Enhanced Dedicated Channel (E-DCH) Radio Network Temporary Identifier (E-RNTI) which is not configured in the cell.

2. The method according to claim 1, wherein
the step of transmitting the absolute grant in response to the determination that:
no absolute grants are scheduled to be transmitted on the absolute grant channel during the given TTI and at least one UE is configured for receiving on the absolute grant channel during the given TTI comprises transmitting the absolute grant at a power level that is lower than the power level at which a prior scheduled absolute grant was transmitted.

3. The method according to claim 2, wherein the reduced power level is at least 2 dB below the level at which the prior scheduled absolute grant was transmitted.

4. The method according to claim 1, wherein
the method is adapted for operating according to High Speed Uplink Packet Access,
the base station is a NodeB, and
the absolute grant channel is a Enhanced Dedicated Channel, E-DCH, Absolute Grant Channel, E-AGCH, channel.

5. The method of claim 1, wherein transmitting the absolute grant in response to the determination that no absolute grants are scheduled to be transmitted on the absolute grant channel during the given TTI and at least one UE is configured for receiving on the absolute grant channel comprises:
selecting a configured UE in the cell;
determining that the selected configured UE is in a soft handover; and
in response to determining that the selected configured UE is in a soft handover, transmitting, during the given TTI, the absolute grant on the absolute grant channel, wherein the absolute grant comprises a UE identifier that is not allocated to any UE or UE group in the cell.

6. The method of claim 1, wherein transmitting the absolute grant in response to the determination that an absolute grant is not scheduled to be transmitted on the absolute grant channel and at least one UE is configured for receiving on the absolute grant channel further comprises:
determining whether the selected UE is in a soft handover, and the step of transmitting to the selected UE the absolute grant on the absolute grant channel is performed in response to determining that the selected UE is not in a soft handover.

7. A base station adapted for scheduling and receiving uplink transmissions from user entities (UEs) in a cell, the base station comprising:
a memory; and
a processing unit, comprising one or more processor, coupled to the memory, the processing unit being configured to, for a given transmission time interval (TTI) on a control channel:
determine whether any absolute grants are scheduled to be transmitted on the control channel during the given TTI; and
determine whether at least one UE is configured for receiving on the control channel during the given TTI, wherein
the base station is configured such that, when the processing unit determines that no absolute grants are scheduled to be transmitted on the control channel during the given TTI and at least one UE in the cell is configured for receiving on the control channel during the given TTI, the base station, during the given TTI, transmits on the control channel an absolute grant,
the transmitted absolute grant comprises a UE identifier that is not allocated to any UE or UE group in the cell, and
the UE identifier is an Enhanced Dedicated Channel (E-DCH) Radio Network Temporary Identifier (E-RNTI) which is not configured in the cell.

8. The base station of claim 7, wherein the base station is configured to transmit the absolute grant at a power level that is lower than the power level at which a prior scheduled absolute grant was transmitted.

9. The method according to claim 8, wherein the reduced power level is at least 2 dB below the level at which the prior scheduled absolute grant was transmitted.

10. The method of claim 7, wherein the base station is configured such that, when the base station determines that no absolute grants are scheduled to be transmitted on the control channel during the given TTI, at least one UE in the cell is configured for receiving on the control channel during the given TTI and is in a soft handover, the base station, during the given TTI, transmits on the control channel said absolute grant.

* * * * *